United States Patent
Abramov et al.

(10) Patent No.: US 10,468,018 B2
(45) Date of Patent: Nov. 5, 2019

(54) METHODS AND SYSTEMS FOR RECOGNIZING AUDIO PLAYED AND RECORDING RELATED VIDEO FOR VIEWING

(71) Applicant: DISH Network L.L.C., Englewood, CO (US)

(72) Inventors: Andrey Abramov, Englewood, CO (US); Alexander Goldobin, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 15/858,345

(22) Filed: Dec. 29, 2017

(65) Prior Publication Data

US 2019/0206392 A1 Jul. 4, 2019

(51) Int. Cl.
*G10L 15/18* (2013.01)
*H04N 21/472* (2011.01)
*H04N 21/4722* (2011.01)

(52) U.S. Cl.
CPC .......... *G10L 15/18* (2013.01); *H04N 21/4722* (2013.01); *H04N 21/47202* (2013.01); *H04N 21/47214* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0247042 A1* | 10/2011 | Mallinson | .......... | G06K 9/00758 725/86 |
| 2012/0177067 A1* | 7/2012 | Cho | .................... | H04N 21/4126 370/503 |
| 2013/0042284 A1* | 2/2013 | Kandanala | ....... | H04N 21/25891 725/104 |
| 2014/0188925 A1* | 7/2014 | Skolicki | ............. | H04N 21/4622 707/765 |
| 2014/0215529 A1* | 7/2014 | Good | ................. | H04N 21/4725 725/60 |
| 2014/0373036 A1* | 12/2014 | Phillips | ............ | H04N 21/42203 725/12 |
| 2018/0167694 A1* | 6/2018 | Kim | .................... | H04N 21/4828 |

* cited by examiner

*Primary Examiner* — Alexander Gee
(74) *Attorney, Agent, or Firm* — Lorenz & Kopf LLP (57) ABSTRACT

Methods and systems for recognizing audio played in order to instruct a media player to record related video, the method includes: configuring a mobile client hosted by a mobile device for capturing audio content played in a vicinity of the mobile device wherein the mobile client captures at least audio data of the audio content played when instructed by a control selection of an user of the mobile client; recognizing, the audio data played, by applications based at a server which process the captured audio data from the mobile device and associate the captured audio data with video data of video content to determine, using the server based applications, video content related to the captured audio content wherein the related video content is generated by or found at one or more video sources in communication with the server; and instructing a media player coupled to the server to record the related video content for subsequent viewing by the user.

15 Claims, 4 Drawing Sheets

METHODS AND SYSTEMS FOR RECOGNIZING AUDIO PLAYED AND RECORDING RELATED VIDEO FOR VIEWING

TECHNICAL FIELD

Embodiments of the subject matter described herein relate generally to features and functions associated with client device applications, such as media player applications. More particularly, embodiments of the subject matter relate to recognizing audio content by client device applications remotely to record related video content at various media playback devices.

BACKGROUND

Often an user at a remote location is listening to audio content played and received in a multitude of manners including being streamed via IP connectivity's; voiced in live appearances or transmissions; transmitted and received via radio frequency, via cellular and other protocols, and desires viewing at a subsequent time, video content of or relating to, or of general interest to the audio content listened to by the user. That is, the user desires at some subsequent time in the near future or in real time to view video content of or related to the audio content which the user is listening too. For example, the user may be listening on a radio type device to audio content of a sporting event and wants to view corresponding video content of the listened too audio content on various media playback devices by actuating media player applications.

Further, the user may desire to use the capabilities of various media playback devices and media player applications designed to play audio and/or video content for viewing video content desired as well as to view video content which corresponds to or is related to the audio content listened toe by the user. In addition, with respect to the these media playback devices, such devices include client devices (such as mobile phones, portable computer devices, desktop computer devices, gaming devices, and medical devices) and typically include media player applications that can play streaming media content, locally stored or recorded media files, and/or media content stored on a tangible memory element such as flash memory, an optical disc, or the like. The presentation of video or audio content can also be supported by vehicle instrumentation panels, tools, system control panels, and the like.

For various reasons, it is desirable to provide enhanced features in a client application, particularly of those in mobile devices that allow for the capturing and recognizing of audio content in order to record or make otherwise available for viewing subsequently by media player devices corresponding or related video content for viewing by the user. A number of such enhanced features, along with other desirable functions and characteristics related to applications suitable for a mobile device and server having capabilities associated with recognizing audio content, will become apparent from the subsequent detailed description and the appended claims, taken in conjunction with the accompanying drawings and this background section.

BRIEF SUMMARY

Disclosed herein is a method and system for recognizing audio played in order to instruct a media player to record related video. An embodiment of the method involves: configuring a mobile client hosted by a mobile device for capturing audio content played in a vicinity of the mobile device wherein the mobile client captures at least audio data of the audio content played when instructed by a control selection of an user of the mobile client; recognizing the audio data played, by applications based at a server which process the captured audio data from the mobile device and associate the captured audio data with video data of video content to determine, using the server based applications, video content related to the captured audio content wherein the related video content is generated by or found at one or more video sources known to the server; and instructing a media player coupled to the server to record the related video content for subsequent viewing by the user. Various embodiments include: the audio data captured may be augmented with audio data other than the audio content played for further processing by the server based applications wherein the other audio data includes user voice comments.

The method may further include: recording related video content in accordance with attributes of a profile associated with the user of particular video content wherein the profile is prior provisioned at either the server or the media player; and recording related video content conditionally based on input of an user instructing the media player to proceed with a recording action or not by a control selection at the mobile client. In addition, the method may include: executing artificial intelligent and/or machine learning applications at the server executed to make determinations in conjunction with an user selection or by automated actions as to whether to record related video content wherein the recorded related video content which results may comprise: direct, indirect or not related video content to the captured audio content as determined by the artificial intelligence and machine learning applications. The method may further include: presenting related video content in real-time to the mobile client by applications of the server based on the captured audio data which is received by the user. The audio content played at least may further include: streaming audio content, recorded audio content, live performances generating audio content and live events generating audio content. The method may include: receiving meta data at the server wherein the meta-data is associated with the mobile device and the captured audio content and processed by application at the server to recognize the captured audio content; and generating signatures of the audio data at the server for use in making determinations of which video data are corresponding related video data and for recording the related video content.

In another embodiment, that is an embodiment of a system for recognizing audio played in order to instruct a media player to record related video, the system may include: a mobile client hosted by a mobile device for capturing audio content played in a vicinity of the mobile device wherein the mobile client captures at least audio data of the audio content played when instructed by a control selection of an user of the mobile client; a backend server coupled to the mobile device to recognize the audio data played, the backend server receiving the captured audio data from the mobile device and associating the captured audio data with video data of video content for determining, using backend server based applications, video content related to the captured audio content wherein the related video content is generated by one or more video sources known to the backend server; and a media player coupled to the backend server to record the related video content for viewing by the user.

In various embodiments, the audio data captured may be augmented with audio data other than the audio content played for further processing at the backend server. The system may include: a profile setting associated with user attributes to enable recording related video content in accordance therewith; and a recording action to record related video content based on user input of a control selection at the mobile client to instruct the media player to proceed with the recording action. The system may further include: artificial intelligent and/or machine learning applications at the backend server executed to make determinations in conjunction with user selection or by automated actions as to whether to record related video content, wherein recorded related video content resulted may comprise: direct, indirect or not related video content as a result of the determinations made by the artificial intelligent and machine learning application executions.

The system may further include: a presentation in real-time or immediate of the related video content to the mobile client by applications connected to the backend server based on the captured audio data received to enable real-time or an immediate viewing by the user. The audio content played at least may further include: streaming audio content, recorded audio content, live performances generating audio content and live events generating audio content. The system may further include: meta-data sent to the backend server for processing by applications at the backend server to recognize the captured audio content wherein the meta-data is associated with the mobile device and the captured audio content. In addition, the system may include: signature data generated of the audio data at the backend server to enable matching of related video data based on the signature data.

In yet another embodiment, a tangible and non-transitory computer readable storage medium having executable instructions stored thereon that, when executed by a processor device, are capable of performing a method of recognizing audio played in order to instruct a media player to record related video, the method includes: configuring a mobile client hosted by a mobile device for capturing audio content played in a vicinity of the mobile device wherein the mobile client captures at least audio data of the audio content played when instructed by a control selection of an user of the mobile client; recognizing, the audio data played, at a server the captured audio data from the mobile device and associating the captured audio data with video data of video content for determining, using server based applications, video content related to the captured audio content wherein the related video content is generated by video sources in communication with the server; and instructing a media player in communication with the server to record the related video content for subsequent or an immediate viewing by the user. In addition, in the storage medium wherein the method may further include: sharing snippets of the related video content via social media networks or to other mobile devices for viewing by particular users.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

An online media distribution service, such as the service currently available at www.sling.com, distributes content that is obtained from one or more sources to viewers over the Internet or a similar network. Distributed content may include television content, movies, other audio/visual content, audio content and/or the like. Typically, viewers can connect to the online distribution service using a conventional web browser or other client to obtain streaming or file-based content as desired. Because users of such services typically demand a large variety of content, such distribution services often receive their distributed content from any number of different production sources, syndicators, web-based services and/or other media sources as appropriate. Certain features of a media player application can be used with an app for recognizing audio content and for generating commands or controls to impart the media player application to record related video content on the media player device.

Figure 1:
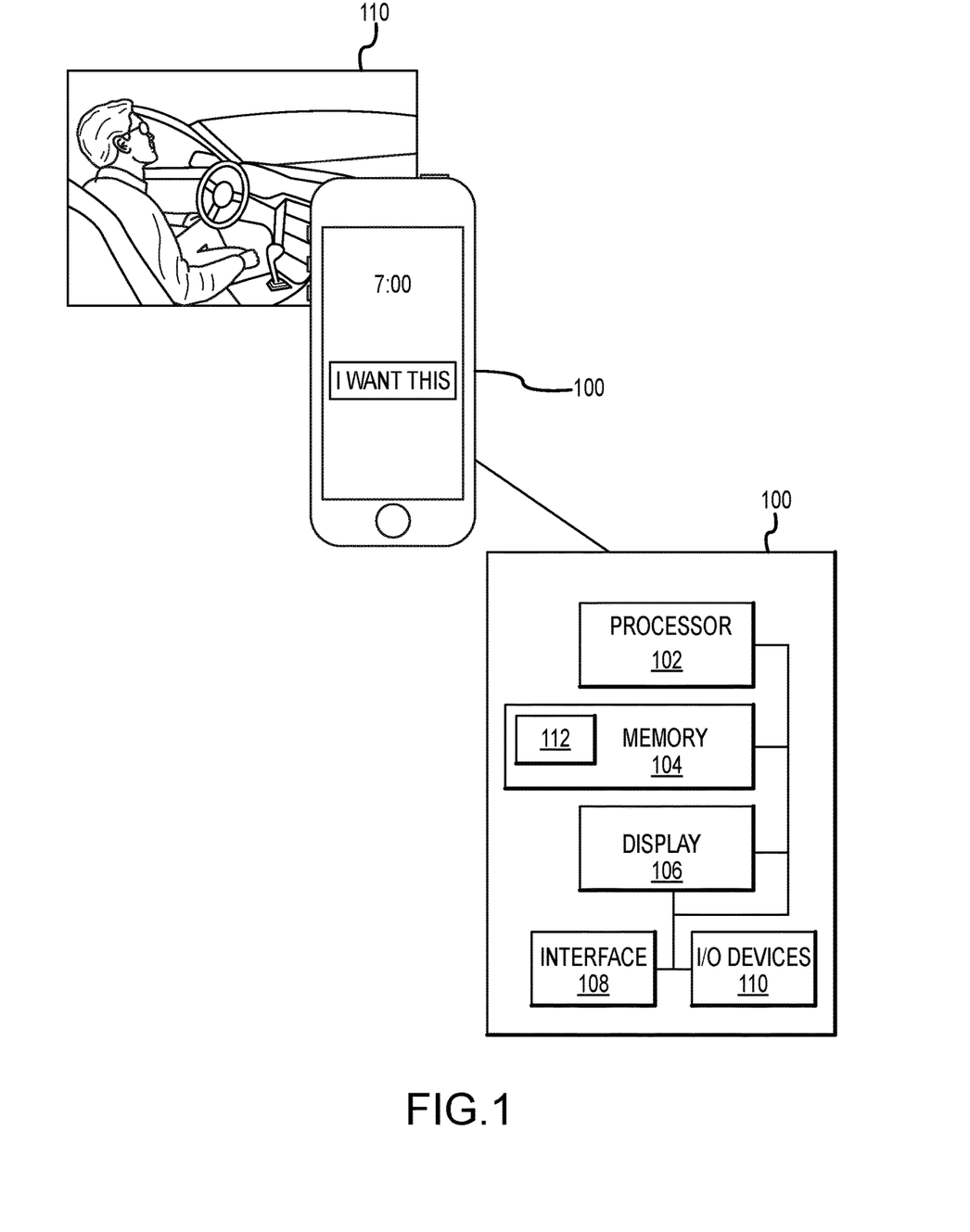
FIG. 1 is a representation of an user hearing an audio content desired and a mobile device for use with an audio recognizing app for recording video content in accordance with an exemplary embodiment.

Turning now to the drawings, FIG. 1 illustrates a representation of a user hearing an audio content desired and a mobile device for use with a client app which includes an audio recognizing app for recognizing the user heard audio content and to record related video content in accordance with an exemplary embodiment. FIG. 1 illustrates an user, while driving, using the client app on a mobile device for recognizing audio content that user is listening too and for subsequently recording of video content which is the same, related, or of general interest to the user at a remote location on media player device for subsequent or immediate viewing by the user. For example, the user may choose to view the video content when the user is not driving or when the user reaches a particular destination. In an alternate embodiment, a user who is a passenger may also be listening to the audio content and use a client app for enabling the recognizing of the audio of the content and the immediate or real-time, or subsequent viewing via a media player device, of related video content.

In various embodiments, the client app for recognizing audio content may be configured in-car entertainment (ICE), or in-vehicle infotainment (IVI), that provides audio or video entertainment. For example, the client app may be integrated in the IVI system through APPLE CARPLAY® or similar mobile application that enables use of mobile device apps on a mobile device using a vehicle existing controls. In other alternative embodiments, the display may not be limited to the ICE or IVI systems but to any type of display without limitation such as a display of: a mobile telephone; a personal computer (in any form factor, including a desktop, a laptop, a handheld, etc.); a tablet computing device; a wearable computing device; a video game device or console; a digital media player device; a household appliance; a piece of home entertainment equipment; a medical device; a navigation device; an electronic toy or game; a vehicle instrument or instrument panel; a control panel of a piece of machinery, a tool, or the like; a digital camera or video camera; a weapon; a musical instrument; or a remote control device. It should be appreciated that this list is not exhaustive, and it is not intended to limit the scope or application of the embodiments described herein.

Turning back to the drawings, FIG. 1 discloses a user 110 driving with a mobile device of device 100. The mobile device of device 100 is depicted in a simplified block diagram representation of an exemplary embodiment of a computer-based device that supports the presentation of media content. The device 100 generally includes, without limitation: at least one processor device 102; at least one memory element 104; a touchscreen display 106; at least one communication (network) interface 108; and input and output (I/O) devices 110. In practice, the device 100 can include additional components, elements, and functionality that may be conventional in nature or unrelated to the particular media playback functionality described here. In this regard, the device 100 can include a touchpad, or the like, instead of or in addition to the touchscreen display 106 as well as microphone for capturing audio. The touchscreen display 106 of a user interface component can be utilized with the device 100 for actuating the client app for capturing audio content by an user activation selection. In some instances, the user activation selection may be in the form of a physical actuation on the touchscreen display 106, in other instances, user activation may be triggered by natural language processing (NLP) of voiced user commands by applications of the device 100. In yet another embodiment, user activation may be accomplished via a physical input device, such as a button or a toggle, connected to the mobile device via Bluetooth, ZigBee or some other protocol, for example by a button built into a car's steering wheel.

The mobile device may include components of a processor device 102, for example, which may include a central processing unit (CPU), a field programmable gate array (FPGA), a microcontroller, an application specific integrated circuit (ASIC), or any other logic device or combination thereof; a memory element 104 which is communicatively coupled to the processor device 102, and can be implemented with any combination of volatile and non-volatile memory. The memory element 104 has non-transitory computer-executable instructions (program code) 112 stored thereon, wherein the instructions 112 are configurable to be executed by the processor device 102 as needed. When executed by the processor device 102, the instructions 112 cause the processor device 102 to perform the associated tasks, processes, and operations defined by the instructions 112. Of course, the memory element 104 may also include instructions associated with a file system of the host device and instructions associated with other applications or programs. Moreover, the memory element 104 can serve as a data storage unit for the host device. For example, the memory element 104 can provide a storage buffer for audio packets or the like that are processed in part locally or note, and are sent to a remote application server for further processing.

The touchscreen display 106 may be integrated with the device 100 or communicatively coupled to the device 100 as a peripheral or accessory component. The shape, size, resolution, and technology of the touchscreen display 106 will be appropriate to the particular implementation of the device 100. The touchscreen display 106 can be realized as a monitor, screen, or another conventional electronic display that is capable of graphically presenting data and/or information provided by the device 100. The touchscreen display 106 is communicatively coupled to the processor device 102, and it can leverage existing technology to detect touch gestures and contact with a user's finger (or fingers), a stylus, or the like. In addition, the touchscreen display 106 is suitably configured to generate or otherwise provide activation control information that is associated with touch and force detected at the surface of the touchscreen display 106. In some embodiments, a touch-sensitive surface, like a trackpad, may be used for input instead of a touchscreen.

The communication interface 108 of the device 100 represents the hardware, software, and processing logic that enables the device 100 to support data communication with other devices. In practice, the communication interface 108 can be suitably configured to support wireless and/or wired data communication protocols as appropriate to the particular embodiment. For example, if the device 100 is a smartphone, then the communication interface 108 can be designed to support a cellular communication protocol, a short-range wireless protocol (such as the BLUETOOTH communication protocol), and a WLAN protocol. As another example, if the device 100 is a desktop or laptop computer, then the communication interface can be designed to support the BLUETOOTH communication protocol, a WLAN protocol, and a LAN communication protocol (e.g., Ethernet). In practice, the communication interface 108 enables the device 100 to receive media content for presentation on the touchscreen display 106, wherein the media content can be downloaded, streamed, or otherwise provided for real-time (or near real-time) playback or for storage at the device 100.

The I/O devices 110 of device 100 enable the user of the device 100 to interact with the device 100 as needed. In practice, the I/O devices 110 may include, without limitation: a speaker, an audio transducer, or other audio feedback component; a haptic feedback device; a microphone; a mouse or other pointing device; a touchscreen or touchpad device; a keyboard; a joystick; or any conventional peripheral device. In this context, the touchscreen display 106 can be categorized as an I/O device 110.

This description assumes that an electronic device of the type described above can be operated to record audio, communicate with a backend server and present media content to a user. The source, format, and resolution of the media content are unimportant for purposes of this description. Indeed, the data that conveys the media content can be locally stored at the electronic device, or it can be provided in a streaming media format from a content source, a service provider, a cloud-based entity, or the like. The following description assumes that the electronic device and the media player can successfully and compatibly process, render, and display the desired media (video) content in an appropriate manner. Further, although the media player can be designed and configured in a variety of different ways, certain basic features are found in the exemplary embodiments presented here.

Figure 2:
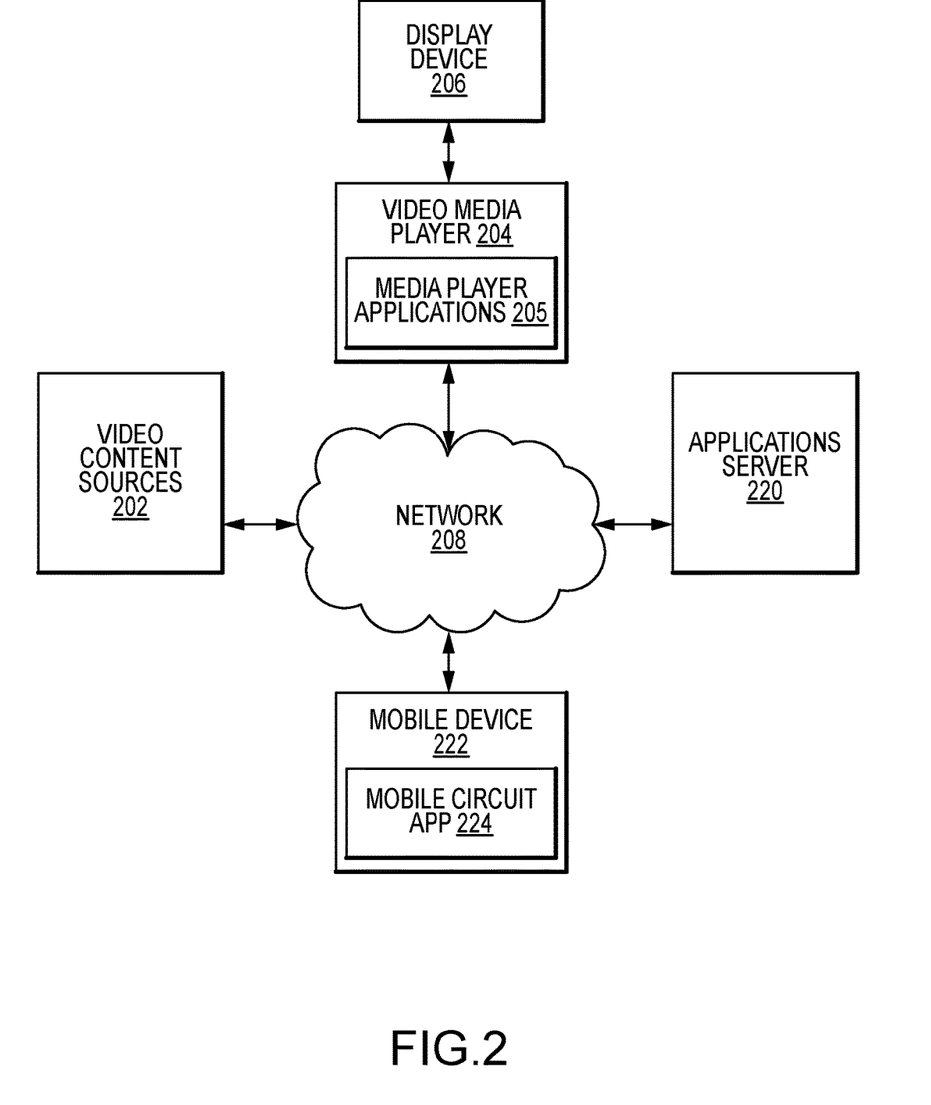
FIG. 2 is a simplified block diagram of a system of an audio recognizing app on a mobile device for use in recording video content in accordance with an exemplary embodiment.

FIG. 2 shows an exemplary mobile device 222 that could be used to control media content from any number of sources. "Media content" refers to any audio, video, audio/visual or other programming in any streaming, file-based or other format. In various embodiment, the mobile device 222 (via a mobile client 224) navigates an on screen user interface of a display device 206 which include items displayed of television, movie and/or other audiovisual works in any digital format such as MPEG®, WINDOWS® Media, QUICKTIME®, Real Media, H.264 and/or the like. Such content may be provided to any number of viewers using any sort of media player 204 (via a media player application 205) which may include a receiver and is controlled by the mobile device 222. In various embodiments, the media playback devices could include desktop or notebook computers, mobile telephones, personal digital assistants, video game players, portable media players and/or any other devices capable of receiving media content via a network and rendering audio and/or visual content to a viewer.

The network 208 is any digital or other communications network capable of transmitting messages between senders (e.g., host server 220) and receivers (e.g., mobile device 222). In various embodiments, network 208 includes any number of public or private data connections, links or networks supporting any number of communications protocols. The network 208 may include the Internet, for example, or any other network based upon TCP/IP or other conventional protocols. In various embodiments, network 208 may also incorporate a wireless and/or wired telephone network, such as a cellular communications network for communicating with mobile phones, personal digital assistants, and/or the like. Various embodiments of network 208 may also incorporate any sort of wireless or wired local area networks, such as one or more IEEE 802.3 and/or IEEE 802.11 networks.

The host server 220 is any server or collection of servers capable of providing a front-end or other portal to system 200 that allows viewers to access media content. In various embodiments, host server 220 is a conventional web-type server that provides data to conventional web browsers or other client applications. Such data may be provided over network 208 using conventional TCP/IP, HTTP and/or other protocols as desired. Generally, host server 220 will be implemented across any number of physical and logical hosts. For example, metadata and other visual content may be provided via a typical web portal residing at a well-known URL or other address, whereas streamed or other distributed content may be delivered from a separate host associated with a content delivery network or other provider. Conventional web hosting and development techniques may be applied to create a network host in any manner.

The media content may be received, formatted and made available on host server 220 in any manner. In various embodiments, content is received from any number of different content of sources 202 at a receiving server. Content of sources 202 may include studios or other content creators, syndicators or other content distributors, television networks, production houses, web or other network-based distributors, and/or any number of other content sources 202 as desired. Content may be delivered across any medium, including any sort of point-to-point or networked link. In various embodiments, the Internet or a similar network 208 may be used to receive content from one or more content of sources 202 as well as to distribute processed content to viewers. Providing content from multiple sources, however, can create a number of challenges. Often, each content source has its own preferred format for transporting new material. Media files may be delivered, for example, in any number of different manners (e.g., RSS, pushed or pulled FTP/TFTP, HTTP and/or the like). Moreover, files may be received in any number of different compressed and/or uncompressed formats that need to be transcoded or otherwise converted before the content is available for distribution to viewers. Further, as viewers use an increasing variety of client devices (e.g., mobile phones, video game players, and other portable devices), it may be desirable to encode/transcode received content into any number of different distribution formats (e.g., formats of different sizes, bit rates, frame rates, resolutions and/or other parameters) to accommodate a variety of viewers and viewing devices. Hence, the types and amounts of transcoding or other processing that may be needed before distributing the received content can be significant.

Moreover, many different content providers have unique formats for the metadata that describes the media content. Most websites provide at least some description of the content that is distributed: this description may include the name of the program, names of actors/actresses, a brief description of the programming, any ratings or parental control information, or any other information as desired. This "metadata" information about the programming content may be provided by the content provider with the media content itself, or it may be retrieved from any other source as desired. In either case, formatting of the metadata can be a significant challenge due to the wide variety of formats that may be used by any number of different data sources.

Although FIG. 2 shows content being received at a host server 220, in practice content may be provided directly from sources 202 to media player 204. The host server 220, when present, suitably receives content from one or more sources 202 and provides the received content to a processing system (not shown) to the media player 204. In embodiments that do provide a receiving host server 220, this server may be any conventional computing system capable of manually and/or automatically receiving content via any sort of pushed or pulled FTP/TFTP session, RSS or other automated syndication, and/or any other techniques.

Metadata about the received content may be obtained from any source. In various embodiments, metadata is obtained from the content of sources 202 with the delivered content itself. In other instances, metadata may be obtained from any sort of database connected to the network 208. The databases may be a web-based or other networked source of information (e.g., a database that can support queries across network). Alternately, the database may be a local database that is not available on network 208.

In some embodiments, host server 220 suitably obtains the content and/or metadata using any relevant transport mode, and then performs a transformer process on the received content to place the received content (and its associated metadata, if appropriate) into a known format, as described more fully below. For example, the transformed content may be formatted as a media bus request (MBR) that is wrapped in an appropriate decorator or other structure for subsequent processing via the network 208. Again, in some embodiments the host server 220 may be partially or wholly eliminated, and content providers of sources 202 could simply provide some or all of their content in the preferred format directly to media player 204 for subsequent processing. Content providers could format MBR or other structures with appropriate decorators, for example. Content could alternately be delivered in any proprietary, open or other agreed-upon format to reduce the need for pre-processing by host server 220, as desired.

Received content may be processed using any sort of processing system. Various embodiments may be implemented using dedicated or shared hardware servers; other implementations may make use of virtual server features as part of a "cloud computing" service, such as any of the cloud computing services provided by AMAZON®, GOOGLE®, MICROSOFT®, IBM®, UBUNTU®, SUN MICROSYSTEMS® and/or any number of other providers. The AMAZON®WEB SERVICES (AWS) products and services available from AMAZON.COM, for example, could be used to implement some or all of processing system in some embodiments, although other embodiments may use any other products or services as desired.

Content and metadata is therefore received from any number of sources as desired. Received content is processed to properly format or otherwise prepare the content for distribution from host server 220 on network 208 to any number of mobile devices 222.

Figure 3:
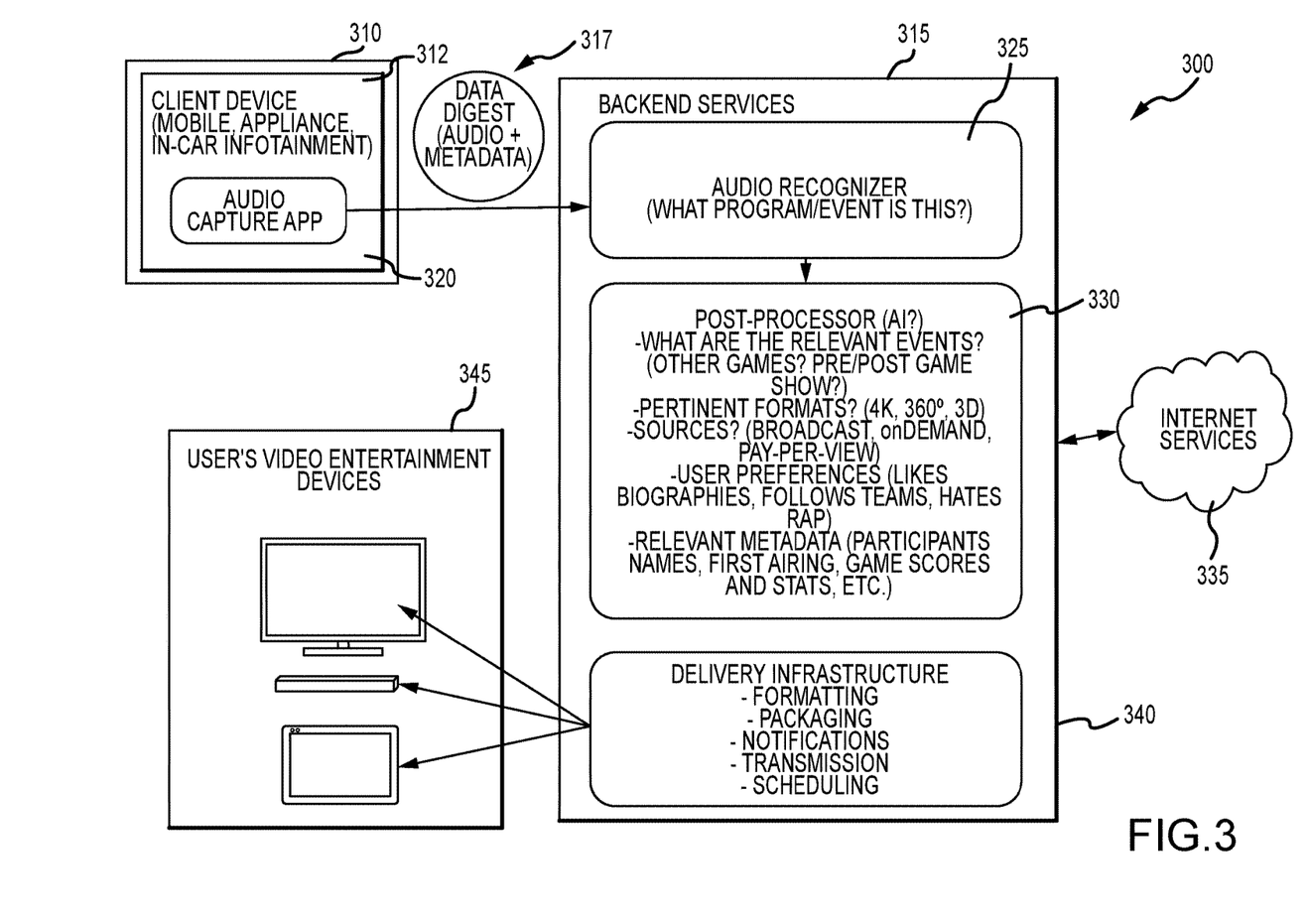
FIG. 3 is a simplified diagram that illustrates an app for recognizing audio content and for recording related video content at a media player device remotely coupled in accordance with an exemplary embodiment.

FIG. 3 is a simplified diagram that illustrates an app for recognizing audio content and for recording related video content at a media player device remotely coupled in accordance with an exemplary embodiment. The system 300 of FIG. 3 includes a mobile client 312 for capturing audio services using an audio capture app 320 hosted by a mobile device 310, an application server 315 with processing units (not shown) that host and execute multiple backend applications that include an audio recognizer 325, post processing applications 330, and applications and components making up a delivery infrastructure 340 for transmitting and communicating with video entertainment devices 345.

In various embodiments, the mobile device 310 includes the mobile client 312 which may use a mobile software development kit platform. The mobile device 310 may include any mobile or connected computing device including "wearable mobile devices" having an operating system capable of running mobile apps individually or in conjunction with other mobile or connected devices. Examples of "wearable mobile devices" include GOOGLE® GLASS™, OCULUS RIFT®, and ANDROID® watches. Typically, the device will have capabilities such as a display screen, a microphone, speakers and may have associated keyboard functionalities or even a touchscreen providing a virtual keyboard as well as buttons or icons on a display screen. The mobile client 312 may additionally include other apps including the audio capture app 320 as well as SDK app platform tools and further can be configurable to enable downloading and updating of the SDK app platform tools. In addition, the mobile client 312 uses an SDK platform which may be configurable for a multitude of mobile operating systems including ANDROID®, APPLE® iOS, GOOGLE® ANDROID®, and MICROSOFT®'s WINDOWS Phone OS.

In various embodiments, a user may actuate the audio capture app 320 by touch or using voice recognition applications configured by the mobile device 310 when listening to particular audio content. The audio capture app 320 as an example, would capture audio content of an event, program or other content being played in the vicinity of the user. In addition, the audio capture app 320 may capture additional audio content not played. For example, such audio content may include voiced content by the user, voiced content by others in the vicinity of the user. In such instances, the audio content may characterized as a data digest 317 to be sent to application server 315 for further processing and generating related video content. In an exemplary embodiment, the data digest 317 may include audio data comprising segments or audio packet data and meta data of the audio content which the user desired to be recognized and used for finding corresponding or related video content for recording by media recording devices of the video entertainment devices 345 of the user. In an exemplary embodiment, the user may start a recording or a broadcast capture at the moment of a user's request versus finding a video recording of the whole event from the beginning (may not be available). In an exemplary embodiment, a digital signature may be generated at the server of the audio packet data of audio content received and characterized by the data digest 317. In instances, the audio content received may require further processing for extracting or discerning particular audio information or augment information of the event or program etc. that the user is listening too. With such audio packet information as well as the meta-data further post-processing of the audio packet information occurs at the server 315.

In various embodiments, the server 315 includes functionalities of recognizing the data extracted from the data digest 317 by use of applications of the audio recognizer 325 as well as post processing applications 330 one or more determinations of related video content. That is, the application solutions of the audio recognizer 325 may allow for recognizing a particular program or event and using the information for further post processing by post processing applications 330 for recognizing related video content for viewing by the user. The post processing application 330 may include at least the following applications of determining other relevant events and corresponding video content for recording by the user; in instances of sporting event, determining related post and pre-game video events being broadcast, as well as related sporting events being broadcast at the present instance or even at a future instance; and further the use of profile information of the user for determining by likes and preferences of the user, related video content. Additionally, post processing applications 330 may include searching connected sources of broadcasts, on-demand events, pay-per-view events. In instances, the searches for related video content may be based on particular genres of interest to the user (as determined by user profile preferences), as well as subject matters, persons, or types of program content determined by extracted data from the data digest 317. Additional preferences or user attributes may be includes such as user likings of particular teams, actors, persons, places, performers as well as in the alternative of user dislikes of music types, teams, sports etc. All such information can be used to perform automated type searching based on audio content captured and data extracted therefrom.

In exemplary embodiments, natural language processing may be used to discern augmented audio content that is voiced by a user or users when listening to particular events. For example, a user may say "I like this singer"; "this song reminds me of a bar in NYC"; "I remember when he scored in last week's game" etc. Such additional or augmented content may provide additional avenues for searching related content and may be extracted using artificial learning solutions (i.e. GOOGLE® ASSISTANT. APPLE SIRI®, BIXBY® etc.), and knowledge processing solutions. In addition, meta data of the audio content received may be used with various machine learning techniques to find related content. For example, pertinent contents such as 4 k, 5 k, 3D may be determined by corresponding meta data and machine learning techniques.

The post processing applications 330 may be coupled to internet services 335 and to a delivery infrastructure 340. The delivery infrastructure 340 may include applications related to formatting, packaging, notifying, transmitting, communicating, and scheduling of related video content at the video entertainment devices 345. In various embodiments, various display configurations may be used for a user to control the presentation of the video content, to enable or disable recording of the related video content and view the recorded related video content on the video entertainment devices 345.

It should be appreciated that the process described in the system 300 may include any number of additional or alternative applications and tasks, the applications shown in FIG. 3 need not be performed in any particular illustrated order, and the system 300 may be incorporated into a more comprehensive procedure or process having additional functionality not described in detail herein. Moreover, one or more of the applications shown in FIG. 3 could be omitted from an embodiment of the process of system 300 as long as the intended overall functionality remains intact.

Figure 4:
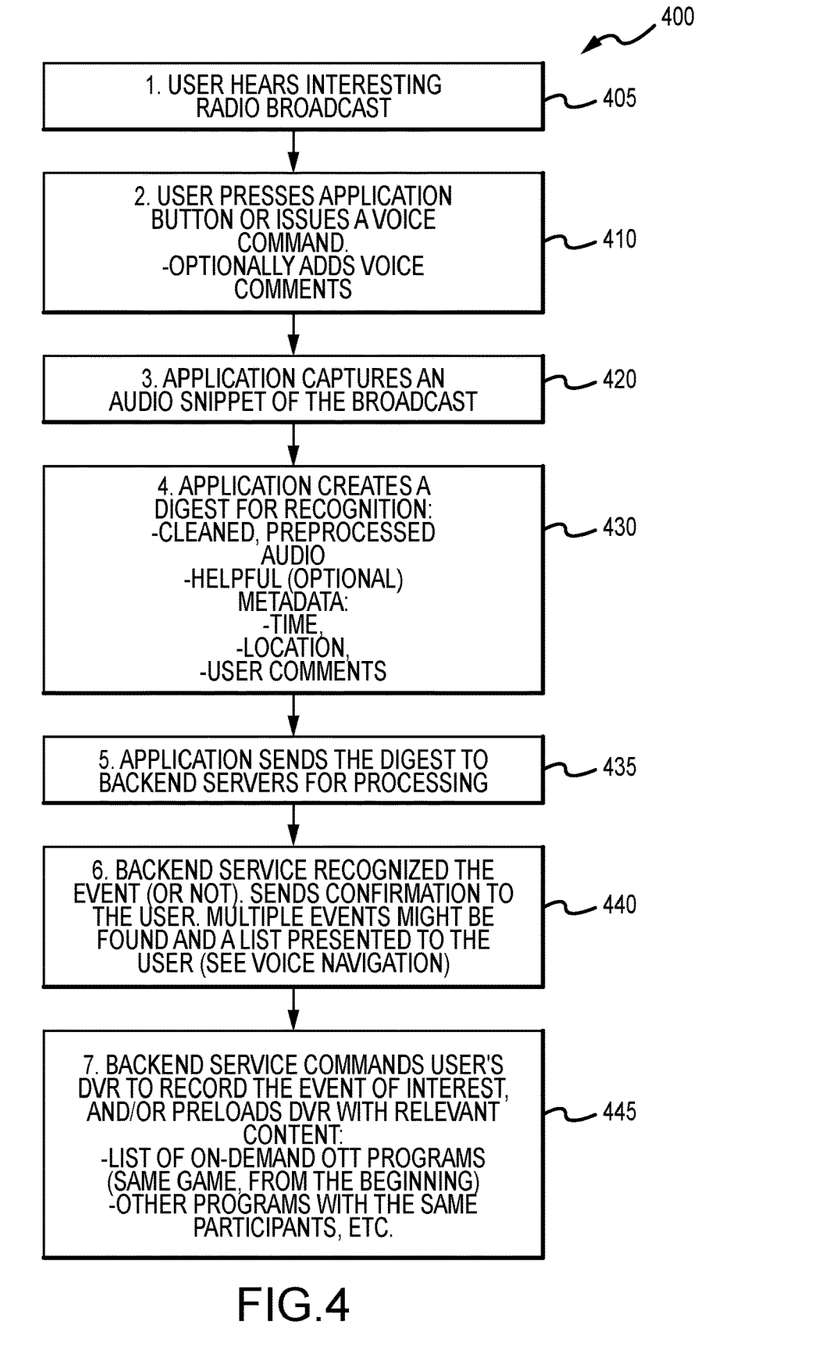
FIG. 4 is an exemplary embodiment of a flowchart that depicts the operation of the FIGS. 1-3.

FIG. 4 is an exemplary flowchart of an audio content recognition system for enabling related video content to be recorded by an user when hearing a particular audio content played. The process 400 illustrates features of a system which enables a user to listen to particular audio of events, programs and other happenings and actuate a client side app to recognize the particular audio and extract data to enable related video to be recorded for viewing by the user. While it is contemplated that the related video would be recorded and viewed at a later time, the process 400 should not be viewed as so limiting, in that, the related video may be viewed instantaneously by use of connected mobile devices to the media players associated with recording the related video content. That is, in instances, related video, for example, broadcast live or streamed live may be conveyed via real-time streaming applications or recorded for viewing in near real time to mobile devices associated with the user for viewing while listening to the audio content.

Continuing with the flowchart of FIG. 4, at the initial step of task 405, the user may hear an interesting event or performance broadcasted by a radio frequency broadcast device such as radio. Upon hearing a desired audio broadcast, the user would trigger the client app performing the audio capture and recognition. That is, at task 410, the user presses a button configured on an user interface which may be displayed on a touch screen of a mobile device. In an alternative embodiment, the user may voice commands or even optionally add voice comments when listening to the particular audio. That is, provided that mobile device has voice recognition capabilities as well the appropriate hardware for performing voice recognition. At task 420, the client app may capture an audio snippet via the microphone connected to the mobile device. Alternately, the audio snippets may be captured directly via audio channels of media devices broadcasting the audio. For example, the client app may be integrated in a vehicle entertainment system and be enabled to directly connect to the audio broadcast or stream that the user desires related video content of for recording. At task 430, the client side app generates by applications configured locally a data digest which includes the process steps of cleaning pre-processed audio (or may receive raw audio), noise removal solutions may also be applied to the captured audio, in addition, tagging or adding of meta data including time, location and user comments may also be included in the data of the data digest. Also, formatting of the audio in the data digest may also occur. At task 435, the client app may using particular solutions transmit, send, upload data of the data digest in part or the data digest in its entirety to a backend server for further processing. At task 440, the backend server uses various applications for processing the audio data received and for recognizing events prescribed by the audio data or for not recognizing events prescribed therein. That is, the backend processing solutions make determinations of whether the received audio content contains sufficient data for recognizing related video content or not. In an exemplary embodiment, the backend server may send a confirmation to the client app to notify the user that a particular event has or has not been recognized, that more audio capture is needed. The backend server may send the user via the client app, a list or multiple events recognized, a list of multiple related video or may ask the user for further assists such as posing questions on event type, genre, subject matter etc. for better recognition. In alternative embodiment, the backend server may present the user with a first set or may categorize the list in select menu for further user selections of related video events for capture. The user depending on the capabilities of the mobile device may be enabled to make selections or augment the data by voiced commands or voiced inputs. At task 445, the backend server service may command or instruct, media players or recording devices associated with the particular user to record events of interests as selected by the user or by automated pre-select settings. The recordings may be conditionally recorded for a period of time or may be permanently or nearly permanently recorded for viewing. In an exemplary embodiment, the user may start a recording or a broadcast capture at the moment of a user's request versus finding a video recording of the whole event from the beginning (may not be available). The recordings may be shared with other users, may be shared via links to social media connected to the user via other provisioned accounts coupled to the media player or mobile client. The recording devices may be, in the case of a sporting event, record other related sporting events, or tournament events. It is contemplated that the recording settings and the sharing of the content are configurable as the user may choose, and may be configurable in advance, at the time of the event or may be configurable to a limited extent after the event. In the latter case, as an example, the user chooses not to further record related content; there may be conditional settings that require confirmations to proceed or not to proceed in the recording activities.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, or the like, various elements of the systems and devices described herein are essentially the code segments or instructions that cause one or more processor devices to perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for recognizing audio played in order to instruct a media player to record related video, the method comprising:
   configuring a mobile client hosted by a mobile device for capturing audio content played in a vicinity of the mobile device;
   receiving by a control selection operation by an user to the mobile client for an instruct to the mobile client to capture at least audio data of the audio content played in the vicinity of the mobile device;
   configuring the audio data of at least the audio content played in the vicinity of the mobile device into a data digest by the mobile client prior for sending to a server remotely coupled to the mobile client wherein the data digest comprises at least audio data of: audio content played and of audio data in the vicinity of the mobile device other than solely the audio content played in the vicinity of the mobile device;
   processing the audio data of the data digest to determine if the audio data is sufficient for recognition, to recognize at least the audio content played, by applications based at the server only, to associate at least the audio data configured in the data digest with data associated with video content sent at the server to determine, using the server based applications, video content related to at least the audio content played in the vicinity of the mobile device wherein the video content is generated from one or more video sources in communication with the server;
   instructing a media player coupled to the server to record the video content related to at least the audio content played in the vicinity of the mobile device for viewing by the user after the audio content has been captured;
   searching, post processing of the audio data of the data digest, video content of the one or more video sources connected in communication with the server which at least comprise: broadcasts, on-demand events, pay-per-view events for related video content to record which is determined from the audio data of the data digest wherein the video content is searched based on a search set that at least comprises: genres, subject matters, persons, and types of program content; and
   recording related video content conditionally based on only input of an user instructing the media player to proceed with a recording action without a control selection at the mobile client.

2. The method of claim 1, further comprising:
   executing artificial intelligent and/or machine learning applications at the server executed to make determinations in conjunction with an user selection or by automated actions as to whether to record related video content wherein the recorded related video content which results may comprise: direct, indirect or not related video content to the captured audio content as determined by the artificial intelligent and machine learning applications.

3. The method of claim 1, further comprising:
   presenting related video content in real-time to the mobile client by applications of the server based on the captured audio data which is received by the user.

4. The method of claim 1, wherein the audio content played at least further comprises:
   streaming audio content, recorded audio content, live performances generating audio content and live events generating audio content.

5. The method of claim 1, further comprising:
   receiving meta data at the server wherein the meta-data is associated with the mobile device and the captured audio content and processed by application at the server to recognize the captured audio content.

6. The method of claim 5, further comprising:
   generating signatures of the audio data at the server for use in making determinations of which video data are corresponding related video data and for recording the related video content.

7. A system for recognizing audio played in order to instruct a media player to record related video, the system comprising:
   a mobile client hosted by a mobile device configured to capture audio content played in a vicinity of the mobile device wherein the mobile client captures at least audio data of the audio content played;
   the mobile client configured to receive a control selection operation by an user to instruct the mobile client to capture at least audio data of the audio content played;
   a data digest configured with at least the audio content played which has been captured by the mobile client prior to sending by the mobile client wherein the data digest comprises at least audio data of: audio content played and of audio data other than the audio content played;
   a backend server coupled to the mobile device to receive the data digest and to process the audio content of the data digest to determine whether the audio content is sufficient for recognition and then to recognize the audio content played, the backend server associating the captured audio content with video content by determining, using backend server based applications, video content related to the audio content wherein the video content is sent from one or more video sources in communication with the backend server;
   a media player coupled to the backend server to record related video content for viewing by the user; and
   the media player configured to perform a post processing action to search, after processing the audio data of the data digest, video content of the one or more video sources connected in communication with the server which at least comprise: broadcasts, on-demand events, pay-per-view events, for related video content to record which is determined from the audio data of the data digest based on genres, subject matters, persons, and types of program content; and the media player configured to perform a recording action to record related video content based on only input of an user instructing the media player to proceed without a control selection at the mobile client.

8. The system of claim 7, further comprising:
a profile setting associated with user attributes to enable recording related video content in accordance therewith.

9. The system of claim 7, further comprising:
artificial intelligent and/or machine learning applications at the backend server executed to make determinations in conjunction with user selection or by automated actions as to whether to record related video content wherein recorded related video content resulted may comprise: direct, indirect or not related video content to the captured audio content as a result of the determinations made by the artificial intelligent and machine learning application executions.

10. The system of claim 7, further comprising:
the media player configured to perform:
a presentation in real-time or immediate of the related video content to the mobile client by applications of the backend server based on the captured audio data received to enable real-time or an immediate viewing by the user.

11. The system of claim 7, wherein the audio content played at least further comprises:
streaming audio content, recorded audio content, live performances generating audio content and live events generating audio content.

12. The system of claim 7, further comprising:
meta-data sent to the backend server for processing by applications at the backend server to recognize the captured audio content wherein the meta-data is associated with the mobile device and the captured audio content.

13. The system of claim 12, further comprising:
signature data generated of the audio data at the backend server to enable matching of related video data based on the signature data.

14. A tangible and non-transitory computer readable storage medium having executable instructions stored thereon that, when executed by a processor device, are capable of performing a method of recognizing audio played in order to instruct a media player to record related video, the method comprising:
configuring a mobile client hosted by a mobile device for capturing audio content played in a vicinity of the mobile device;
receiving by a control selection operation by an user to the mobile client an instruct to the mobile client to capture at least audio data of the audio content played;
configuring the audio data of at least the audio content played into a data digest by the mobile client prior for sending to a server remotely coupled to the mobile client wherein the data digest comprises at least audio data of: audio content played and of audio data other than the audio content played;
processing the audio data of the data digest to determine whether the audio data is sufficient for recognition and then to recognize the audio content played, by applications based at the server only to associate at least the audio data configured in the data digest with data associated with video content played at the server to determine, using the server based applications, video content related to the audio content played wherein the video content is sent from one or more video sources in communication with the server;
instructing a media player coupled to the server to record the video content related to at least the played audio content for subsequent viewing by the user;
searching, post processing of the audio data of the data digest, video content of the one or more video sources connected in communication with the server which at least comprise: broadcasts, on-demand events, pay-per-view events for related video content to record which is determined from the audio data of the data digest wherein the video content is searched based on a search set that at least comprises: genres, subject matters, persons, and types of program content; and
recording related video content conditionally based on only input of an user instructing the media player to proceed with a recording action without a control selection at the mobile client.

15. The storage medium of claim 14, wherein the method further comprises:
sharing snippets of the related video content via social media networks or to other mobile devices for viewing by particular users.

* * * * *